United States Patent [19]
Lühmann et al.

[11] Patent Number: 4,517,324
[45] Date of Patent: May 14, 1985

[54] VISCOUS CELLULOSE-CONTAINING MIXTURE (PASTE) AND A PROCESS FOR THE PRODUCTION OF AQUEOUS COATING EMULSIONS THEREFROM

[75] Inventors: Erhard Lühmann, Bomlitz; Lutz Hoppe; Klaus Szablikowski, both of Walsrode; Friedrich-Karl Lampert, Bomlitz, all of Fed. Rep. of Germany

[73] Assignee: Bayer Aktiengesellschaft, Leverkusen, Fed. Rep. of Germany

[21] Appl. No.: 429,469

[22] Filed: Sep. 30, 1982

[30] Foreign Application Priority Data

Oct. 7, 1981 [DE] Fed. Rep. of Germany ....... 3139840

[51] Int. Cl.$^3$ ............................ C09D 3/12; C08L 1/00
[52] U.S. Cl. ......................................... 524/27; 524/31; 524/35; 524/37; 524/57; 524/310; 524/313; 524/370; 524/376; 106/162; 106/163 R; 106/169; 106/195; 106/163.1
[58] Field of Search ........................ 524/27, 31, 35, 37, 524/57, 310, 313, 366, 370, 376; 106/162, 163 R, 169, 195; 536/30, 56, 58

[56] References Cited

U.S. PATENT DOCUMENTS

| | | | |
|---|---|---|---|
| 3,216,840 | 11/1965 | Rouse, Jr. et al. | 106/195 |
| 3,421,919 | 1/1969 | Lin | 524/31 |
| 3,522,070 | 7/1970 | Webb, Jr. | 524/31 |
| 3,556,826 | 1/1971 | Gronholz et al. | 524/31 |
| 4,066,818 | 1/1978 | Junge et al. | 524/590 |
| 4,153,592 | 5/1979 | Burroway et al. | 524/376 |
| 4,177,172 | 12/1979 | Traenckner et al. | 524/31 |

FOREIGN PATENT DOCUMENTS

| | | |
|---|---|---|
| 540723 | 12/1931 | Fed. Rep. of Germany . |
| 918286 | 9/1954 | Fed. Rep. of Germany . |
| 1922411 | 11/1970 | Fed. Rep. of Germany . |
| 6602026 | 8/1967 | Netherlands . |
| 1426727 | 3/1976 | United Kingdom . |

Primary Examiner—John Kight
Assistant Examiner—Nathan M. Nutter
Attorney, Agent, or Firm—Connolly and Hutz

[57] ABSTRACT

A viscous cellulose substance containing paste which is characterized by containing an alkoxylated plasticizer and a ratio of solid to the organic solvent phase of $\geq 1$ and which can be used to prepare a lacquer consisting at most of 25% of an organic solvent.

11 Claims, No Drawings

VISCOUS CELLULOSE-CONTAINING MIXTURE (PASTE) AND A PROCESS FOR THE PRODUCTION OF AQUEOUS COATING EMULSIONS THEREFROM

It is known that aqueous coating compositions can be produced from cellulose esters.

Thus, DOS No. 2,203,554 describes the production of nitrocellulose lacquer emulsions having a solids content of from 13 to 16.6% by weight and a solvent content of from 37.6 to 44.2% by weight.

The concentration ratios of solids to solvent are always less than 1 and correspond to the usual concentration ratios (cf DOS No. 2,203,554, page 5, first paragraph with reference to A. Kraus, Handbuch der Nitrocelluloselacke, Verlag W. Pansergrau, Berlin-Wilmersdorf, 1952).

The high solvent content is regarded as necessary because, in conventional mechanical emulsifying techniques (cf. DOS No. 2,203,544, page 5, first paragraph) a low-viscosity organic phase containing the lacquer components has always been considered necessary for obtaining a storable emulsion. It was thought that the organic phase could not be emulsified into the necessary droplet form if it was viscous or paste-like (A. Kraus, Zentralblatt 1940, pages 225, 225).

In order to obviate this disadvantage, an attempt was made to dissolve the lacquer components in an excess of organic solvents, to emulsify the resulting solution in water and then to distill off all or part of the organic solvent (DOS No. 2,703,075, DAS No. 1,286,672). The disadvantage of this process is that it is complicated and very expensive.

It has now surprisingly been found that a viscous, cellulose-containing paste having the composition according to the invention may be directly converted into low-solvent, high-solids aqueous cellulose lacquer emulsions providing the ratio of solids to the organic solvent phase before emulsification in water is greater than or equal to 1.

In this connection, it is surprising that stable emulsification of the organic solvent phase in water is achieved without the assistance of significant shear forces and at low temperatures (up to at most 45° C.).

The present invention provides viscous, cellulose-containing mixtures or pastes consisting of (a) from 5.0 to 60, preferably from 15 to 45% by weight, of a cellulose substance, (b) from 0 to 55, preferably from 0 to 35% by weight, of resins, (c) 0.5 to 55, preferably from 1 to 30% by weight, of plasticisers, (d) from 0 to 20, preferably from 0 to 12.5% by weight, of emulsifiers, (e) from 0 to 45, preferably from 5 to 35% most preferably from 5 to 25% by weight, of at least one organic solvent, and (f) from 0 to 30, preferably from 5 to 25% by weight, of water, wherein the sum of (a) to (f) always must amount to 100% by weight, characterised in that from 0.5 to 100% by weight of the plasticiser consists of at least one alkoxylated plasticiser and the ratio of solids to organic solvent phase is greater than or equal to 1.

The present invention also provides a process for the production of storable, aqueous coating emulsions of the oil-in-water type based on an organic phase, emulsified in water, of a cellulose substance, at least one alkoxylated plasticiser, optionally an emulsifier and resins, optionally dissolved in an organic solvent or solvent mixture, wherein a ratio of solids to organic solvent phase of $\geq 1$ is maintained during preparation of the organic phase, into which water in the usual quantities is added, preferably dropwise, without further dilution of the organic phase at temperatures at a maximum of 45° C., preferably 40° C.

The cellulose substance used is preferably a cellulose ether, particularly nitrocellulose of any viscosity or plasticised nitrocellulose or mixtures thereof.

Nitrocellulose, for example the usual nitrocellulose types, i.e. cellulose nitric acid esters containing from 10.2 to 12.4% by weight of nitrogen, are particularly suitable.

Suitable plasticisers are the usual plasticiser such as, for example, esters of aliphatic mono-carboxylic acids with $C_2$–$C_{18}$ such as cetylacetate, glycol diacetate, stearates, castor oil acetates, of dicarboxylic acids with $C_4$–$C_{10}$ such as dioctyl adipate, dimethylcyclo-hexyl methyl adipate, dimethylcyclo-hexyl methyl adipate, dibutylsebacate or aromatic dicarboxylic acids such as, for example, dibutyl phthalate, dioctyl phthalate, dicyclohexyl phthalate; aliphatic tricarboxylic acids such as, for example, tributyl citrate; inorganic acids such as, for example, tributyl phosphate, triphenyl phosphate; also sulphonamides, oils such as castor oil and linseed oil, and the alkoxylation products of the above mentioned compounds such as, for example, ethoxylated castor oils and soya bean oils, stearates and phosphoric acid esters.

The alkoxylation products of plasticizers, such as ethoxylated castor oils and soya bean oils for example, are particularly suitable.

Suitable emulsifiers are optionally anionic emulsifiers, for example long-chain alkyl aryl sulphonates, such as dodecyl benzene or butyl naphthalene sulphonate, alkyl sulphates, such as lauryl or stearyl alcohol sulphates, sulphosuccinic acid esters, such as dioctyl disodium succinate, or non ionic emulsifiers, such as octyl or nonyl phenol ethoxylates having a degree of ethoxylation of preferably from 4 to 14. Ethoxylated compounds are preferably used.

Any of the usual organic solvents may be used as the solvent for preparing the organic phase.

Preferred solvents are acetates with $C_3$–$C_8$ such as ethyl acetate, isopropyl acetate, butyl acetate, 2-ethyl hexyl acetate, methoxy-n-butyl acetate and ethylglycol acetate butyl glycol acetate, ketones with $C_3$–$C_9$ such as aceton methyl isobutyl ketone, methyl isoamyl-ketone diisobutyl ketone, 2-cyclohexyl hexanone and isophorone, and alcohols with $C_2$–$C_4$ such as isopropylalkohol and butanol.

Other standard resins used as additives for nitro cellulose lacquers, such as for example alkyd, maleic acid, phenolic, formaldehyde, xylene-formaldehyde, ketone, sulfonamide, aldehyde, amine, epoxy, carbamic acid ester, coumarone-indene resins, esters of sucrose, vinyl, acrylate resins and copolymerisation resins thereof, may be added to the cellulose solution.

The coating emulsions are prepared by dissolving the cellulose substance, the plasticiser and, optionally, one or more emulsifiers and other resins in one another, optionally using an organic solvent or solvent mixture, and adding water, preferably dropwise, to the viscous cellulose-containing mixture (paste) without any further dilution at temperatures kept at a maximum of 45° C. and preferably at a maximum of 40° C.

Depending on the application envisaged (for example wood, metal, plastics, paper, leather, glass and film lacquering), other known organic solvents may be added to the inventively prepared emulsion, although the organic solvent concentration should preferably not exceed 25%, based on the final lacquer formulation. In addition, it is also possible to add to the emulsion, preferably to the aqueous phase, substances of the type which improve processing or performance properties such as, for example, lubricants, gloss-improving agents, anti-foam agents, agents which improve sandability, levelling agents, stabilisers, light stabilisers and dyes.

The aqueous coating emulsions produced in accordance which the invention show very good levelling properties coupled with high gloss and high stability in storage. Lacquer compositions formulated in accordance with the particular application envisaged, may, for example, show excellent resistance to alcohols and water or fastness to rubbing in the wet state. The extremely economical, environmentally compatible, low-solvent emulsions are comparable in their performance properties to conventional lacquers produced solely from organic solvents.

EXAMPLE 1

55.0 g of nitrocellulose (NC), Standard 24 E (in the form of 33.75 g of dry NC and 19.25 g of water) were incorporated and homogenised at 30° C. in a solution of 55.9 g of butyl glycol acetate, 5.5 g of ethoxylated nonyl phenol having a degree of ethoxylation (EO) of 12, 4.7 g of ethoxylated castor oil having a degree of ethoxylation (EO) of 80, 1.0 g of dibutyl phthalate and 50.0 g of peanut oil fatty acid alkyd resin (oil content approximately 41%). 108.9 g of water were then stirred in dropwise at 30° C. with the stirrer rotating slowly.

A 35% storable emulsion having an organic solvent content of 20% (solids:solvent=1.75:1) was formed.

The through flow time in a DIN-4-cup was 12.1 seconds.

71.4 g of the 35% emulsion were diluted with 28.6 g of water. A 25% emulsion having a solvent content of 14.3% was formed. This emulsion was subsequently applied to a wood surface by means of a spray gun (3 coats of 70 g/m² of emulsion, drying temperature 23° C.).

The test conditions and the water and alcohol resistance values obtained are shown in Table 1.

EXAMPLE 2

This example is intended to show that NC-containing emulsions are miscible with separately prepared lacquer-component emulsions and have the same performance properties as emulsions in which all the lacquer components were emulsified together.

Emulsion a 55.0 g of nitrocellulose, Standard 24 E (in the form of 35.75 g of dry NC and 19.25 g of water) were incorporated and homogenised in a solution of 27.3 g of butyl glycol acetate, 7.3 g of ethoxylated nonyl phenol having a degree of ethoxylation of 12, 3.7 g of ethoxylated castor oil having a degree of ethoxylation of 80 and 1.0 g of dibutyl phthalate. 42.1 g of water were stirred in dropwise at 30° C. A 35% storable emulsion having a solvent content of 20% was formed (solids:solvent=1.75:1).

Emulsion b 50.0 g of peanut oil fatty acid alkyd resin (oil content approximately 41%), 2.0 g of ethoxylated nonyl phenol having a degree of ethoxylation of 12 and 1.0 g of ethoxylated castor oil having a degree of ethoxylation of 80 were dissolved in 28.6 g of butyl glycol acetate and 66.8 g of water were added dropwise to the resulting solution with stirring at 30° C. A storable 35% dispersion having a solvent content of 20% was formed.

136.4 g of emulsion a were mixed with 148.4 g of emulsion b and 193.2 g of water.

A 25% emulsion having a solvent content of 14% (solids:solvent=1.79:1) was formed. The flowout time from a DIN-4-cup was 11.8 seconds.

The emulsion thus prepared was subsequently applied to a wood surface by means of a spray gun (3 coats of 70 g/m² of emulsion, drying temperature 23° C.).

The test conditions and the water and alcohol resistance values obtained are set out in Table 1.

EXAMPLE 3

97.0 g of nitrocellulose, Standard 24 E (in the form of 63 g of dry NC and 34 g of water) were incorporated and homogenised in a solution of 6.0 g of ethoxylated castor oil having a degree of ethoxylation of 33, 9.0 g of ethoxylated nonyl phenol having a degree of ethoxylation of 12, 4.5 g of dibutyl phthalate, 4.5 g of benzyl butyl phthalate, 40,0 g of peanut oil fatty acid alkyd resin (oil content approximately 43%), 8.0 g of a 10% aqueous NaOH solution, 32.5 g of malinate resin, 34.0 g of urea resin (60% solution in butanol) and 89.2 g of butyl glycol acetate. 189.3 g of water were then stirred in dropwise at 30° C. A 35% storable emulsion having a solvent content of 20% was formed (solids:solvent=1.75:1). The throughflow time from a DIN-4-cup was 15.2 seconds.

71.5 g of the emulsion of Example 1 were stirred with 28.5 g of water, resulting in the formation of a 25% emulsion having a solvent content of 14.3%.

This emulsion was subsequently applied to a wood surface by means of a spray gun (3 coats of 70 g/m² of emulsion, drying temperature 23° C.).

The test conditions and the water and alcohol resistance values obtained are set out in Table 1.

EXAMPLE 4

300.0 g of nitrocellulose, Standard 12 E (in the form of 195 g of dry nitrocellulose and 105 g of water) were incorporated and homogenised at 30° C. in a solution of 73.8 g of ethoxylated castor oil having a degree of ethoxylation of 33, 66.2 g of ethoxylated nonyl phenol having a degree of ethoxylation of 12, 60.0 g of dibutyl phthalate, 13.4 g of castor oil and 272.0 g of butyl glycol acetate. 10.0 g of a 10% aqueous NaOH solution and then 566.0 g of water were stirred in dropwise at 30° C. with the stirrer rotating slowly, resulting in the formation of a 30% storable emulsion having a solvent content of 20% (solids:solvent=1.5:1). The through-flow time through a DIN-4-cup was 14.8 seconds.

50 g of the 30% emulsion were diluted with 50 g of water, resulting in the formation of a 15% emulsion having a solvent content of 10%.

This emulsion was subsequently sprayed onto a leather surface by means of a spray gun (2 coats of 50 g/m² emulsion, drying temperature 23° C.).

The test conditions and the fastness to rubbing (wet) values obtained are set out in Table 2.

EXAMPLE 5

18.0 g of nitrocellulose, standard 12 E (in the form of 11.7 g of dry nitrocellulose and 6.3 g of isopropyl alcohol) were incorporated and homogenised in a solution of 18.0 g of diisobutyl ketone, 4.0 g of dioctyl phthalate amd 4.0 g of ethoxylated castor oil (degree of ethoxylation 40). 75.0 g of water were then stirred in at 30° C. with the stirrer rotating slowly, resulting in the formation of a storable 20% emulsion having a solvent content of 20% (solids:solvent=1:1) and a throughflow time through a DIN-4-cup of 15.0 seconds.

This emulsion was subsequently sprayed onto a leather surface by means of a spray gun (2 coats of 50 g/m$^2$ of emulsion, drying temperature 23° C.).

The test conditions and the fastness to rubbing (wet) values obtained are set out in Table 2.

EXAMPLE 6

215.4 g of nitrocellulose, Standard 24 E (in the form of 140.0 g of dry NC and 75.4 g of water) were incorporated and homogenised at 35° C. in a solution of 40.0 g of ethoxylated castor oil having a degree of ethoxylation of 33, 20.0 g of dibutyl phthalate and 80.0 g of butyl glycol acetate. 1.5 g of a 10.% aqueous NaOH solution and then 140.1 g of water were stirred in dropwise at 30° C. with the stirrer rotating slowly, resulting in the formation of a 40% storable emulsion having a solvent content of 16%. This emulsifier-free NC-containing emulsion may be formulated in accordance with the intended application (solids:solvent=2.5:1). The throughflow time through a DIN-4-cup was 19.2 seconds.

EXAMPLE 7

The procedure was as described in Example 1 of DOS No. 2,203,554 except that the indicated solvent mixture of 25 parts by weight of ethyl hexyl acetate, 25 parts by weight of diisobutyl ketone and 19 parts by weight of toluene was replaced by 18 parts by weight of diisobutyl ketone so that the same concentration ratios as in Example 5 were obtained. This test is intended to show that, through the change in the ratio of solids to solvent from 1:3 to 1:1, it is not possible to obtain storable emulsions by the known emulsifying technique.

18.0 g of nitrocellulose, Standard 12 E (in the form of 11.7 g of dry nitrocellulose and 6.3 g of isopropyl alcohol), 5.0 g of castor oil, 4.0 g of dioctyl phthalate and 4.0 g of ethoxylated castor oil (degree of ethoxylation 40) were dissolved in 18.0 g of diisobutyl ketone. 75.0 g of water were then emulsified in by means of a high-speed turbine mixer. During emulsification, the temperature rose to approximately 65° C. A 20% emulsion having a solvent content of 20% was formed and immediately creamed up irreversibly.

TABLE 1

| Example No. | 1 | 2 | 3 |
|---|---|---|---|
| Flow-out time (1) | 11.8 | 11.8 | 12.3 |
| Resistance to water (2) | 0 | 0 | 0 |
| Resistance to alcohol (3) | 0/1 | 0/1 | 0 |
| Stability in storage | OK after 30 days | OK after 30 days | OK after 30 days |

(1) As measured using a DIN-4-cup
(2) As tested after storage for one week at 23° C.; water-impregnated felt applied for 1 hour.
(3) Tested in the same way as (2) but with a 50% aqueous ethanol solution instead of water.

TABLE 2

| Example No. | 4 | 5 |
|---|---|---|
| Stability in storage | OK after 30 days | OK after 30 days |
| Flow-out time (1) | 11.8 | 15.0 |
| Fastness to rubbing (2) | 1000 | 1000 |

(1) As measured using a DIN-4-cup
(2) The test was carried out after the test panel had been stored for 2 days at 23° C. A felt (2.5 cm in diameter) moistened with water was rotated on the coating under a weight of 1.00 kg. The number of revolutions which the coating withstood without abrasion of the lacquer was counted.

We claim:

1. A stable aqueous coating emulsion based on a viscous cellulose-containing mixture or paste, comprising:
   (a) from 5.0 to 60% by weight of a cellulose substance,
   (b) from 0.0 to 55% by weight of at least one resin,
   (c) from 0.5 to 55% by weight of at least one ethoxylated plasticiser,
   (d) from 0.0 to 20% by weight of at least one emulsifier,
   (e) from 0.0 to 25% by weight of at least one organic solvent,
   (f) from 0.0 to 30% by weight of water,
   the sum of (a) to (f) always must amount to 100% by weight, and the ratio of solids to organic solvent phase is greater than or equal to 1.

2. A mixture or paste as claimed in claim 1, comprising:
   (a) from 15 to 45% by weight of the cellulose substance,
   (b) from 0.0 to 35% by weight of the resin,
   (c) from 1 to 30% by weight of the plasticiser,
   (d) from 0 to 12.5% by weight of the emulsifier,
   (e) from 5 to 25% by weight of the organic solvent, and
   (f) from 5 to 25% by weight of water.

3. A mixture or paste as claimed in claim 1, wherein the cellulose substance is a cellulose ester.

4. A mixture or paste as claimed in claim 3, wherein the cellulose ester is nitrocellulose.

5. A mixture or paste as claimed in claim 1, wherein the plasticiser is an ethoxylated castor oil or soya bean oil.

6. A mixture or paste as claimed in claim 1, wherein the emulsifier is a long-chain alkyl aryl sulphonate, alkyl sulphates, sulphates, succinic acid diester or an octyl or nonyl phenol ethoxylate having a degree of ethoxylation of preferably from 4 to 14.

7. A mixture or paste as claimed in claim 1, wherein the organic solvent is ethyl acetate, isopropyl acetate, butyl acetate, 2-ethyl hexyl acetate, methoxy-n-butyl acetate, ethyl glycol acetate, butyl glycol acetate, acetone, methyl isobutyl ketone, methyl iso amyl ketone, diisobutyl ketone, 2-cyclohexyl hexanone, isophorone or butanol.

8. A mixture or paste as claimed in claim 1, wherein the resin is an alkyd-, maleic acid-, phenolic-, formaldehyde-, xylene-formaldehyde-, ketone-, sulphonamide-, aldehyde-, amine-, epoxy-, carbamic acid ester-, cumaroneindene, vinyl acrylate or copolymerisation resin thereof or an ester of sucrose.

9. A process for the production of a stable aqueous coating emulsion of the oil-in-water type based on a viscous, cellulose-containing mixture or paste, comprising:

(a) from 5.0 to 60% by weight of a cellulose substance,
(b) from 0.0 to 55% by weight of at least one resin,
(c) from 0.5 to 55% by weight of at least one ethoxylated plasticiser,
(d) from 0.0 to 20% by weight of at least one emulsifier,
(e) from 0.0 to 25% by weight of at least one organic solvent,
(f) from 0.0 to 30% by weight of water, the sum of (a) to (f) always must amount to 100% by weight and the ratio of solids to organic solvent phase is greater than or equal to 1 and having an organic solvent concentration of at most 25%, which comprises directly incorporating water in the cellulose-containing mixture or paste without further dilution while maintaining the temperature at a maximum of 45° C.

10. A process as claimed in claim 9, wherein the temperature is maintained at a maximum of 40° C.

11. A coating emulsion obtained by a process as claimed in claim 9.

* * * * *